H. ADELSON & C. W. BLISS.
LIQUID MEASURING AND FILLING APPARATUS.
APPLICATION FILED AUG. 10, 1907.

920,890.

Patented May 4, 1909.
3 SHEETS—SHEET 1.

WITNESSES:
E. M. Fisher
J. P. Mussen

INVENTORS
Harry Adelson
Clark W. Bliss
BY
Fisher & Moser
ATTORNEYS

H. ADELSON & C. W. BLISS.
LIQUID MEASURING AND FILLING APPARATUS.
APPLICATION FILED AUG. 10, 1907.

920,890.

Patented May 4, 1909.
3 SHEETS—SHEET 2.

WITNESSES:

INVENTORS
Harry Adelson
Clark W. Bliss
BY
Fisher & Moort
ATTORNEYS

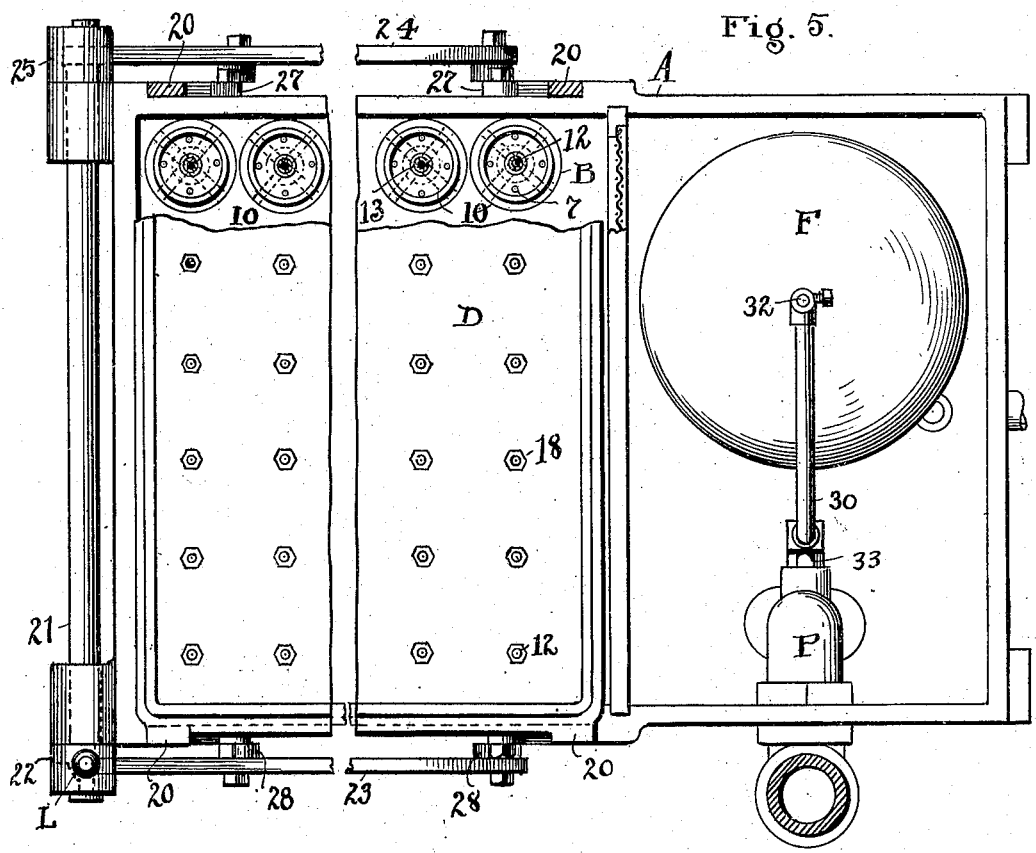
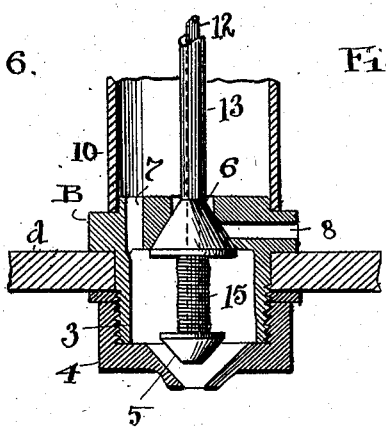
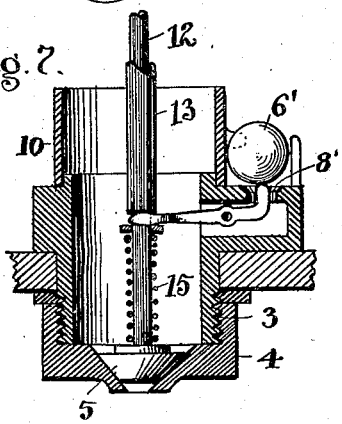

UNITED STATES PATENT OFFICE.

HARRY ADELSON AND CLARK W. BLISS, OF CLEVELAND, OHIO, ASSIGNORS OF ONE-HALF TO CHESTER J. WADSWORTH, OF CLEVELAND, OHIO.

LIQUID MEASURING AND FILLING APPARATUS.

No. 920,890.    Specification of Letters Patent.    Patented May 4, 1909.

Application filed August 10, 1907. Serial No. 387,959.

*To all whom it may concern:*

Be it known that we, HARRY ADELSON and CLARK W. BLISS, citizens of the United States, residing at Cleveland, in the county of Cuyahoga and State of Ohio, have invented certain new and useful Improvements in Liquid Measuring and Filling Apparatus; and we do declare that the following is a full, clear, and exact description of the invention, which will enable others skilled in the art to which it appertains to make and use the same.

Our invention relates to improvements in liquid measuring and filling apparatus, and the object of the invention is to provide an apparatus whereby a number of cans or other containing packages can be filled simultaneously with equal quantities of any free flowing liquid, such as varnish, paint or the like, thereby cheapening the cost and facilitating the operation of packing liquids, all substantially as shown and described and particularly pointed out in the claims.

Figure 1:
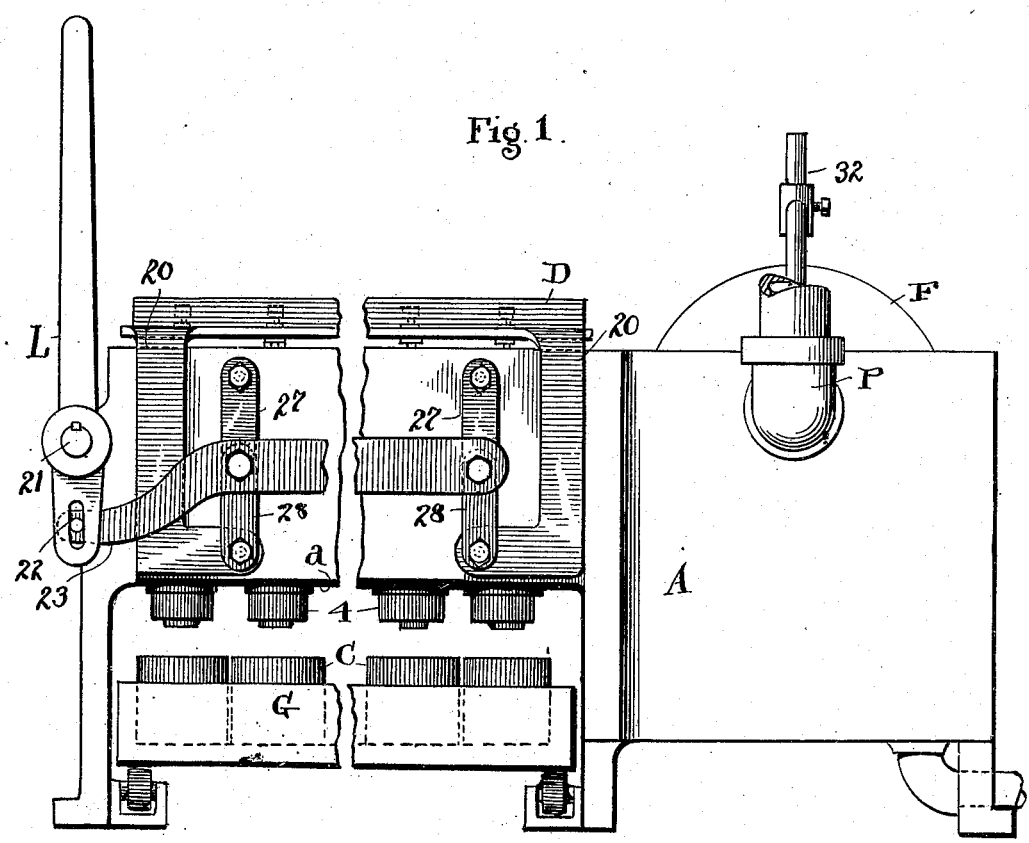
Figure 2:
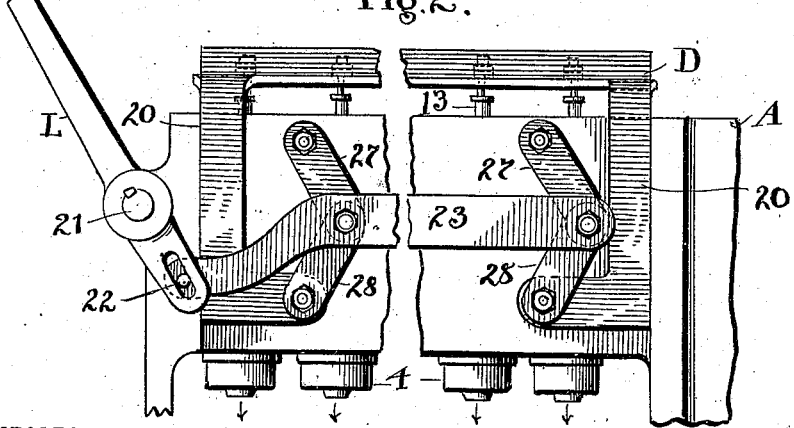
Figure 3:
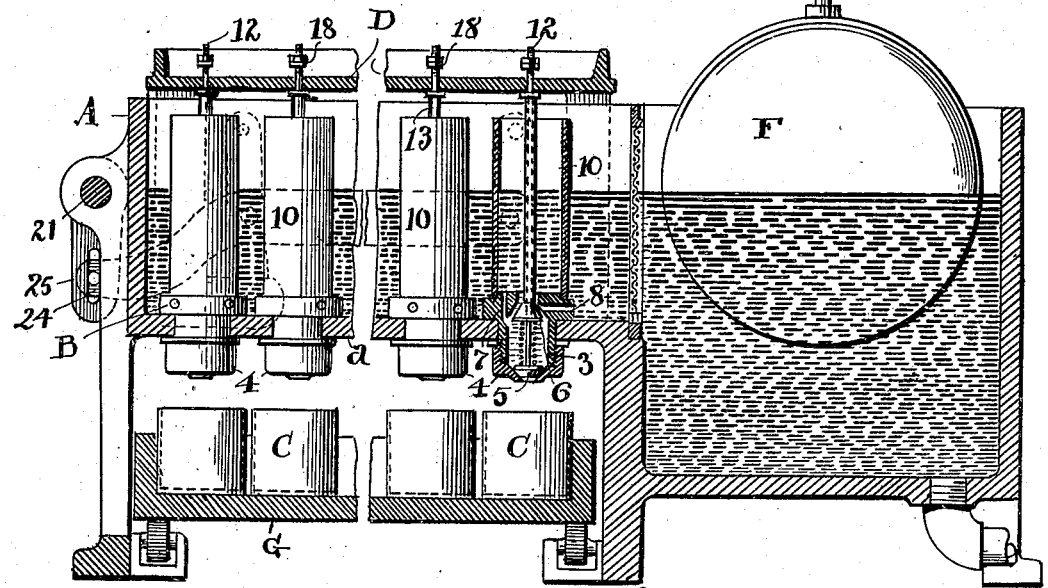
Figure 4:
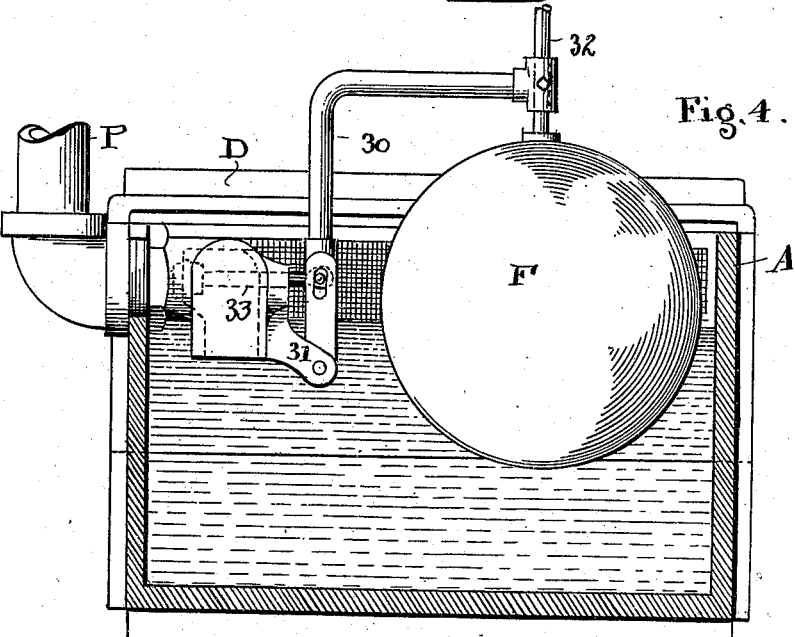

In the accompanying drawings, Figure 1 is a side elevation of our apparatus partially broken out in the center of the can filling portion, and Fig. 2 is a partial side view of Fig. 1, representing the filling portion seen in Fig. 1, and certain operating parts differently positioned from Fig. 1. Fig. 3 is a vertical sectional elevation of the apparatus as represented in Fig. 1, and Fig. 4 is a vertical sectional elevation of the float compartment of the filling tank and at right angles to Fig. 1. Fig. 5 is a plan view of the apparatus, likewise broken out in the center of the filling portion, and Fig. 6 is an enlarged vertical sectional elevation of one of the filling tubes and the valve mechanism associated therewith, as hereinafter fully described. Fig. 7 is a sectional view similar to Fig. 6 but showing a modified form of valve construction.

In the apparatus as thus shown we provide for filling a great number of cans or other receptacles at the same time and with exactly the same quantity of liquid in each can, so that there is absolute uniformity in the measure of liquid contained by the cans. However provision is also made to increase or decrease the quantity to be supplied or filled at any given time, as for measuring half pints, pints, quarts and the like, or fractions thereof. In other words, we can regulate the apparatus to deliver definite quantities of the liquid uniformly at any time and fix the adjustment so that the quantity will not vary while such adjustment exists.

To these ends the invention consists of a suitable tank A, supported in any desirable way at a good working elevation and shown as having a float compartment and a measuring and filling compartment and divided by a screen in this instance, which latter has a floor or bottom $a$ preferably on a raised level to afford working room beneath the same.

Upon bottom $a$ we arrange the measuring tubes or receptacles 10, of whatever shape or size, preferred and which are placed in rows and seated each on a rest or base B of its own. Said rests have each a tubular downward projection 3, extending through a hole in bottom $a$ of the tank and forming a valve chamber. Said chamber is completed by a cap 4 beneath threaded on the said projection 3 and having an opening centrally with a valve seat inside for lower valve 5, closing downwardly. Another valve seat opening is at the top of said valve chamber adapted to valve 6, closing upwardly. Said rest B is further characterized by inlet or supply ducts or ports 8 horizontally through the same and adapted to fill measuring tube 10 to the fluid level of the tank when valve 6 is opened and valve 5 closed, Fig. 3, while fluid ports or ducts 7 serve to discharge the fluid from tube or receptacle 10 into and through said valve chamber, whence it flows into the can C beneath which is filled in this operation. One or the other of said valves is constantly closed, and they are closed alternately in operation. Filling position is seen in Fig. 3, and discharge position in Fig. 6. Valve 5 is controlled by rod 12, and valve 6 by sleeve 13 on said rod, and spring 15 on rod 12 interposes said valves and presses valve 5 to its seat, normally, while valve 6 is kept open by cover D or its equivalent resting thereon and is pressed to its seat by spring 15 when valve 5 is open. The rods 12 project through said cover and have adjusting nuts 18 over the same and side arms 20 project from the cover down at the sides of tank A to serve as guides as the cover is raised and lowered.

Lever L for operating the valves is fixed on axially rotatable shaft 21, which is supported in bearings on tank A, and said lever has a slotted extension below its pivot engaging side pin 22 on actuating bar 23. A corresponding bar 24 is at the other side of the tank engaged by a slotted arm 25, Fig. 3, fixed on shaft 21. Toggle links 27 and 28 respectively engage said bars 23 and 24 in pairs, two on each side, and links 27 are pivoted at their other ends on tank A, and links 28 on side arms or hangers 20.

Now, in operation, to open outlet valves 5 of the numerous measuring receptacles 10, lever L is moved down to position say as seen in Fig. 2, which serves to raise cover D through links 27 and 28 working alike on both sides of the tank and thereby compressing springs 15 and lifting valves 5 from their seats and pressing valves 6 to their seats. As this occurs the fluid supply is cut off by valves 6 and all the cans are alike filled simultaneously. This done the parts are reversed as to position and valves 5 closed and valves 6 opened, Figs. 1 and 3.

The cans to be filled are supported on trays or platforms G, with roller supports for ease of operation and are arranged to come beneath the corresponding filling tubes, and one tray or carrier can follow another in circuit for filling, and any subsequent disposition may be made thereof and of the cans which convenience or the particular need of the liquid may suggest and according to the speed wanted. In any event great speed of operation is possible by this method of measuring and filling, if it be desired.

The measure of liquid carried by any filling tube 10 will depend on two things, its own size and the depth of liquid in the tank. Such depth is determined by a float F and a valve and mechanism controlled by the float, which valve is set to close when the fluid reaches a given level. The said float and mechanism may be such as are common in water closet tanks, and comprises in this instance a right angled arm 30, pivoted on fixed support 31 and having float stem 32 adjustable vertically therein, while valve stem 33 is loosely engaged in a longitudinal slot in said arm 30. This or any equivalent or suitable float controlled mechanism may be used to govern the flow of liquid into tank A through pipe P, and we find that the measure or depth of liquid thus automatically admitted by said valve promptly levels up the tank again and balances the withdrawals, and thus a uniform level is maintained in tank A. For larger cans vessels the fluid level is raised correspondingly, say from a pint measure on a low level to a quart measure on a high level and with the same measuring tubes 10 in both cases. Of course tubes 10 can be substituted by others, larger or smaller, and any equivalent means for controlling the valves may be adopted. In determining the capacity of the measuring tubes, or the liquid to be measured thereby, the size and capacity of the valve chamber must be considered, and said chamber need only have such size as will comfortably accommodate the two valves. Practically, therefore, the valve chamber is a part of the measuring instrumentality comprising tube or receptacle 10. In like manner, other parts may be modified or varied and keep within the spirit of the invention, as, for example, the devices for actuating all the valves 5 and 6. Obviously, this might be done in sundry ways, and hence we do not regard the invention, in these particulars, to be limited to or by the exact means shown. However, cover D is a very desirable element in such controlling mechanism because it serves as a cover for the liquid and as an actuating member as well, and both series of valves are actuated thereby, reversely.

The measuring tubes are open at the top and in any case stand with their tops above the fluid level in the tank.

If ducts 7 and 8 were made relatively large a fairly thick liquid might be handled by this apparatus, and as many of each of said ducts are used as prompt action may require.

In Fig. 7, we show a modified form of valve construction, wherein valve 6 is substituted by a ball valve 6′ which is adapted to seat itself over intake opening 8′ and is raised from its seat by rock member 9 when depressed at its long end by sleeve 13, this construction being shown as one of the forms of the invention in our joint application, Ser. No. 430,652, filed May 4, 1908.

The screen between the receiving and filling compartments of the liquid tank serves especially to intercept any foreign matter that might otherwise come into the receiving side of the tank from the filling side, thereby keeping the liquid in the filling side clear.

What we claim is:—

1. In a liquid measuring and filling apparatus, a tank and a series of receptacles seated on the bottom thereof provided with inlet and exhaust openings one above the other, relatively, and inlet and exhaust valves controlling said openings, the inlet valves having tubular stems and the outlet valves provided with stems projecting up through said tubular stems, and means at the tops of said stems and tubes to control said valves comprising a cover through which said stems project, and means to control said cover.

2. The combination of a tank and means to automatically preserve the liquid level therein, in combination with a liquid measuring and filling receptacle seated in said tank and extending above the liquid level in the tank and provided with an inlet for liquid from said tank at its bottom and an outlet beneath said inlet, and an upwardly closing valve for said inlet and a downwardly closing valve for said outlet.

3. The tank and means to preserve liquid level therein, in combination with a series of receptacles in said tank extending above the liquid therein and rests for said receptacles provided each with a valve chamber open to said tank and at its bottom for discharge and valves adapted to control the filling and the discharge of said receptacle through said chambers and means to simultaneously control all said valves, said means having operating connections over said tank.

4. A liquid measuring and filling apparatus comprising a tank, measuring receptacles therein extending above the fluid level in the tank and seats therefor in the bottom of the tank having each a valve chamber at its bottom provided with inlet and outlet openings respectively, a set of valves for each chamber adapted to open and close said openings successively, and means to operate said valves comprising a cover with which the said valves are operatively connected, side parts depending from said cover and toggle mechanism engaging said side parts and adapted to raise and lower said cover.

5. The combination of a tank and means to maintain a fluid level therein, liquid measuring receptacles seated in said tank and provided with inlets at their bottom for the liquid from the tank and outlets relatively beneath said inlets, and separate valves controlling said inlets and outlets, respectively, the said receptacles extending above the level of the liquid in the tank and means above said receptacle to simultaneously open and close all said valves.

6. A liquid measuring and filling apparatus comprising a suitable tank, measuring vessels seated in said tank and having valve controlled inlet and exhaust openings respectively at their bottom and open at their top to the interior of said tank, mechanism to maintain a uniform liquid level in said tank beneath the tops of said vessels and mechanism to jointly raise and lower said valves.

7. The combination of a liquid receiving tank and means to automatically maintain the liquid level therein, a series of receptacles open at their top above the said liquid level and seated on the bottom of said tank, in combination with separate inlet and outlet valves at the bottom of said receptacles, a top part over said tank with which all said valves are operatively connected, toggle links operatively engaging said part on the sides of the tank and a lever and connections to operate said toggle links and thereby raise and lower said top part and open and close said valves.

In testimony whereof we sign this specification in the presence of two witnesses.

HARRY ADELSON.
CLARK W. BLISS.

Witnesses:
  H. T. FISHER,
  F. C. MUSSUN.